United States Patent
Tenorio

(10) Patent No.: US 7,346,560 B1
(45) Date of Patent: Mar. 18, 2008

(54) PROTECTING CONTENT FROM UNAUTHORIZED REPRODUCTION

(75) Inventor: Manoel Tenorio, Mountain View, CA (US)

(73) Assignee: i2 Technologies US, Inc., Dallas, TX (US)

(*) Notice: Subject to any disclaimer, the term of this patent is extended or adjusted under 35 U.S.C. 154(b) by 729 days.

(21) Appl. No.: 09/895,489

(22) Filed: Jun. 29, 2001

(51) Int. Cl.
G06F 17/30 (2006.01)

(52) U.S. Cl. .................... 705/27; 705/51; 705/57; 705/26; 380/201

(58) Field of Classification Search ............ 705/26, 705/27, 51, 57; 380/201
See application file for complete search history.

(56) References Cited

U.S. PATENT DOCUMENTS

| | | | |
|---|---|---|---|
| 3,961,164 A | 6/1976 | Reed et al. ............ 235/61.12 |
| 5,347,632 A | 9/1994 | Filepp et al. ............ 395/200 |
| 5,551,027 A | 8/1996 | Choy et al. ............ 395/600 |
| 5,564,043 A | 10/1996 | Siefert ............ 395/600 |
| 5,642,419 A | 6/1997 | Rosen ............ 380/23 |
| 5,694,546 A | 12/1997 | Reisman ............ 395/200.9 |
| 5,721,832 A | 2/1998 | Westrope et al. ............ 395/227 |
| 5,727,129 A | 3/1998 | Barrett et al. ............ 395/12 |
| 5,777,608 A | 7/1998 | Lipovski et al. ............ 345/189 |
| 5,790,677 A | 8/1998 | Fox et al. ............ 380/24 |
| 5,870,473 A | 2/1999 | Boesch et al. ............ 580/21 |
| 5,892,900 A * | 4/1999 | Ginter et al. ............ 726/26 |
| 5,903,897 A * | 5/1999 | Carrier et al. ............ 707/203 |
| 5,905,505 A * | 5/1999 | Lesk ............ 345/630 |
| 5,918,229 A | 6/1999 | Davis et al. ............ 707/10 |
| 5,926,797 A | 7/1999 | Goodwin, III ............ 705/20 |
| 5,935,207 A | 8/1999 | Logue et al. ............ 709/219 |
| 5,963,134 A | 10/1999 | Bowers et al. ............ 340/572.1 |
| 5,970,471 A | 10/1999 | Hill ............ 705/26 |
| 5,983,309 A | 11/1999 | Atsatt et al. ............ 711/4 |
| 5,987,233 A | 11/1999 | Humphrey ............ 395/200.47 |
| 5,991,115 A | 11/1999 | Chainer et al. ............ 360/75 |

(Continued)

FOREIGN PATENT DOCUMENTS

EP   1174806 A1 *   7/2000

OTHER PUBLICATIONS

Heath, Terry, "A safer world for replicators", Billboard, Aug. 24, 1996.*

(Continued)

*Primary Examiner*—Mark Fadok
(74) *Attorney, Agent, or Firm*—Booth Udall, PLC

(57) ABSTRACT

In one embodiment of the present invention, a computer-implemented system for protecting from unauthorized reproduction data associated with one or more products that is communicated over a communications network includes one or more servers. The servers collectively receive data associated with one or more products matching search criteria specified in a search query received from a buyer computer, the data having been collected in response to communicating the search query to one or more databases in which data associated with one or more products is stored. The servers collectively communicate to the buyer computer the data for the matching products and communicate a software component to the buyer computer, the software component operable to provide a user associated with the buyer computer access to the data for the matching products, the software component further operable to disable one or more tools supported at the buyer computer for reproducing the data.

20 Claims, 4 Drawing Sheets

U.S. PATENT DOCUMENTS

| | | | |
|---|---|---|---|
| 6,006,218 A | 12/1999 | Breese et al. | 707/3 |
| 6,016,493 A | 1/2000 | Burrows | 707/101 |
| 6,038,668 A | 3/2000 | Chipman et al. | 713/201 |
| 6,049,673 A | 4/2000 | McComb et al. | 395/712 |
| 6,078,891 A | 6/2000 | Riordan et al. | 705/10 |
| 6,081,840 A | 6/2000 | Zhao | 709/224 |
| 6,094,680 A | 7/2000 | Hokanson | 709/223 |
| 6,101,515 A | 8/2000 | Wical et al. | 707/531 |
| 6,105,134 A | 8/2000 | Pinder et al. | 713/170 |
| 6,128,600 A | 10/2000 | Imamura et al. | 705/27 |
| 6,128,624 A | 10/2000 | Papierniak et al. | 707/104 |
| 6,144,996 A | 11/2000 | Starnes et al. | 709/217 |
| 6,154,738 A | 11/2000 | Call | 707/4 |
| 6,189,043 B1 | 2/2001 | Buyukkoc et al. | 709/241 |
| 6,192,131 B1 | 2/2001 | Geer, Jr. et al. | 380/283 |
| 6,199,082 B1 | 3/2001 | Ferrel et al. | 707/522 |
| 6,212,512 B1 | 4/2001 | Barney et al. | 707/1 |
| 6,236,975 B1 | 5/2001 | Boe et al. | 705/7 |
| 6,236,978 B1 | 5/2001 | Tuzhilin | 705/26 |
| 6,271,846 B1 | 8/2001 | Martinez et al. | 345/357 |
| 6,285,366 B1 | 9/2001 | Ng et al. | 345/356 |
| 6,286,002 B1 | 9/2001 | Axaopoulos et al. | 707/10 |
| 6,289,382 B1 | 9/2001 | Bowman-Amuah | 709/226 |
| 6,324,522 B2 | 11/2001 | Peterson et al. | 705/28 |
| 6,334,131 B2 | 12/2001 | Chakrabarti et al. | 707/10 |
| 6,336,910 B1 | 1/2002 | Ohta et al. | 604/6.13 |
| 6,341,280 B1 | 1/2002 | Glass et al. | 707/3 |
| 6,343,287 B1 | 1/2002 | Kumar et al. | 707/4 |
| 6,343,738 B1 * | 2/2002 | Ogilvie | 235/381 |
| 6,356,899 B1 | 3/2002 | Chakrabarti et al. | 707/5 |
| 6,366,910 B1 | 4/2002 | Rajaraman et al. | 707/5 |
| 6,370,527 B1 | 4/2002 | Singhal | 707/6 |
| 6,415,320 B1 | 7/2002 | Hess et al. | 709/219 |
| 6,460,038 B1 | 10/2002 | Khan et al. | 707/10 |
| 6,466,240 B1 | 10/2002 | Maslov | 345/853 |
| 6,466,918 B1 | 10/2002 | Spiegel et al. | 705/27 |
| 6,470,344 B1 | 10/2002 | Kothuri et al. | 707/100 |
| 6,476,832 B1 | 11/2002 | Park | 345/789 |
| 6,489,968 B1 | 12/2002 | Ortega et al. | 345/713 |
| 6,490,567 B1 | 12/2002 | Gregory | 705/39 |
| 6,490,619 B1 | 12/2002 | Byrne et al. | 709/223 |
| 6,516,350 B1 | 2/2003 | Lumelsky et al. | 709/226 |
| 6,532,481 B1 | 3/2003 | Fassett, Jr. | 707/203 |
| 6,553,364 B1 | 4/2003 | Wu | 707/1 |
| 6,581,072 B1 | 6/2003 | Mathur et al. | 707/104.1 |
| 6,591,252 B1 | 7/2003 | Young | 705/67 |
| 6,704,161 B1 | 3/2004 | Tenorio et al. | 707/2 |
| 6,745,177 B2 | 6/2004 | Kepler et al. | 707/3 |
| 6,775,655 B1 * | 8/2004 | Peinado et al. | 705/59 |
| 6,778,991 B2 | 8/2004 | Tenorio | 707/10 |
| 6,922,693 B1 * | 7/2005 | Rubin et al. | 707/7 |
| 2001/0016846 A1 | 8/2001 | Chakrabarti et al. | 707/102 |
| 2001/0032162 A1 | 10/2001 | Alsberg et al. | 705/37 |
| 2001/0034814 A1 | 10/2001 | Rosenzweig | 711/118 |
| 2001/0044751 A1 | 11/2001 | Pugliese, III et al. | 705/26 |
| 2001/0051927 A1 | 12/2001 | London et al. | 705/51 |
| 2002/0026386 A1 | 2/2002 | Walden | 705/27 |
| 2002/0032597 A1 | 3/2002 | Chanos | 705/10 |
| 2002/0046187 A1 | 4/2002 | Vargas et al. | 705/67 |
| 2002/0107842 A1 * | 8/2002 | Biebesheimer et al. | 707/3 |
| 2002/0123955 A1 | 9/2002 | Andreski et al. | 705/37 |
| 2002/0147704 A1 | 10/2002 | Borchers | 707/3 |
| 2003/0033205 A1 | 2/2003 | Nowers et al. | 705/26 |
| 2003/0149934 A1 | 8/2003 | Worden | 715/513 |
| 2003/0167213 A1 | 9/2003 | Jammes et al. | 705/27 |
| 2003/0195877 A1 | 10/2003 | Ford et al. | 707/3 |
| 2004/0068576 A1 | 4/2004 | Lindbo et al. | 709/232 |

OTHER PUBLICATIONS

Birkmaier, Craig, "Free no more?", Television Broadcast's digitalTV, Apr. 2000.*

Unknown, "website2Go Commerce User Guide, Shopping Cart Online Help," webshop2Go User Guide, http://web.archive.org/web/20000824163512/http://shopguide.website2go.com/, 2 pages, internet date May 27, 2003.

Unknown, "1998-1999 Database Seminar Series," Uoft Data Base Group, Database Seminar, http://www.cs.toronto.edu/DB/main/seminars98.html, 4 pages, internet date May 27, 2003.

Unknown, "Pars International parleys its sales automation strengths into E-Commerce leadership using Java and IBM SanFrancisco," IBM Press Release Sep. 1998, Pars.com—IBM Press Release Sep. 1998, http://www.pars.com/Ultra/IBMPressRelease.htm, 3 pages, internet date May 27, 2003.

Unknown, "ONYX Internet Ltd, The Challenge," eBusiness Innovation Awards 1999, http://www.ecommerce-awards.com/awards2000/winners/1998/finalists/onyx.html, 2 pages, internet date May 28, 2003.

Unknown, "eBay—Your Personal Trading Community," http://web.archive.org/web/19990117033159/pages.ebay.com/aw/index.html, About eBay, SafeHarbor, Bookmarks eBay Store, Go Global!, 9 pages (last updated Jan. 16, 1999), internet date May 28, 2003.

Unknown, "Welcome to Amazon.com," Amazon.com—Earth's Biggest Selection, http://web.archive.org/web/19991013091817/http://amazon.com/, 6 pages, internet date May 23, 2003.

Unknown, "Northern Light Search," http://web.archive.org/web/19980206192654/http://www.northernlight.com/, 18 pages, internet date May 28, 2003.

Tracy Marks, "Lesson Two: My Computer and Explorer continued, G. Explorer: Orientation," Windows 95 Manual, Lesson 2, Using Explorer, Copying Files, http://www.windweaver.com/w95man2g.htm, 4 pages (copyright 1995, '96, '97), internet date May 23, 2003.

Unknown, "Sample Full Hit Highlighting Form, Query i2 against document /news/1690.asp," Microsoft® Index Server, http://www.industryweek.com/iisamples/issamples/oop/qfullhit.htw?CiWebHitsFile=%2Fnews, 2 pages, internet date Dec. 3, 2001.

Unknown, "Sample Full Hit Highlighting Form, Query tradematrix again document /columns/text/689.asp," Microsoft® Index Server, http://www.industryweek.com/iisamples/oop/qfullhit.htw?CiWebHitsFile=%2Fcolum, 2 pages, internet date Dec. 3, 2001.

PCT, Notification of Transmittal of the International Search Report or the Declaration, 3 pages, Dec. 28, 2001.

PCT, Notification of Transmittal of the International Search Report or the Declaration, 3 pages, Dec. 31, 2001.

Uknown, "UDDI Technical White Paper," Universal Description, Discovery and Integration, uddi.org, International Business Machines Corporation and Microsoft Corporation, 13 pages, Sep. 6, 2000.

U.S. Appl. No. 09/858,322, entitled "Pre-Qualifying Sellers During the Matching Phase of an Electronic Commerce Transaction," filed May 15, 2001, 40 total pages (.0839).

U.S. Appl. No. 09/858,269, entitled "Facilitating Electronic Commerce Transactions Using Buyer Profiles," filed May 15, 2001, 41 total pages. (.0842).

U.S. Appl. No. 09/859,266, entitled "Facilitating Electronic Commerce Transactions Using a Shared Product Data Repository," filed May 16, 2001, 39 total pages. (.0844).

U.S. Appl. No. 09/884,007, entitled "Content Enhancement in an Electronic Marketplace," filed Jun. 18, 2001, 44 total pages. (.0849).

U.S. Appl. No. 09/892,300, entitled "Providing Market Feedback Associated with Electronic Commerce Transactions to Sellers," filed Jun. 26, 2001, 43 total pages. (.0840).

U.S. Appl. No. 09/895,654, entitled "Translation Between Product Classification Schemas," filed Jun. 28, 2001, 39 total pages (.0841).

U.S. Appl. No. 09/895,525, entitled "Association of Data with a Product Classification Schema," filed Jun. 28, 2001, 50 total pages. (.0843).

U.S. Appl. No. 09/895,490, entitled "Third Party Certification of Content in Electronic Commerce Transactions," filed Jun. 29, 2001, 42 total pages. (.0845).

U.S. Appl. No. 09/884,393, entitled "Distributed Processing of Search Results in an Electronic Commerce System," filed Jun. 18, 2001, 47 total pages. (.0846).

U.S. Appl. No. 09/895,894, entitled "Protecting Content from Unauthorized Reproduction," filed Jun. 29, 2001, 44 total pages. (.0848).

AT&L Knowledge Sharing System "Ask a Professor—Question & Answer Detail," 2 pages.

* cited by examiner

| | 152b | 152c | 152d | 152e 156 | | 152n |
|---|---|---|---|---|---|---|
| PID | PRODUCT TYPE | MANUFACTURER | INK COLOR | TIP SIZE | CURRENCIES ACCEPTED | PRICE |
| 23 | BALL POINT | ABC | BLUE | MEDIUM | US DOLLARS | 0.12 |
| 29 | BALL POINT | ABC | BLACK | MEDIUM | US DOLLARS | 0.12 |
| 56 | BALL POINT | XYZ | BLACK | MEDIUM | US DOLLARS | 0.13 |
| 98 | BALL POINT | XYZ | GREEN | MEDIUM | US DOLLARS | 0.13 |
| ... | ... | ... | ... | ... | ... | ... |
| 12 | FELT TIP | XYZ | BLACK | BROAD | US DOLLARS | 0.17 |
| 16 | FELT TIP | ABC | BLACK | BROAD | US DOLLARS | 0.18 |
| 56 | FELT TIP | ABC | RED | FINE | US DOLLARS | 0.16 |
| 123 | FELT TIP | XYZ | RED | FINE | US DOLLARS | 0.16 |
| ... | ... | ... | ... | ... | ... | ... |
| 2 | ROLLER BALL | XYZ | BLUE | FINE | US DOLLARS | 0.25 |
| 59 | ROLLER BALL | XYZ | BLACK | FINE | US DOLLARS | 0.25 |
| 143 | ROLLER BALL | XYZ | BLACK | MEDIUM | US DOLLARS | 0.22 |
| 456 | ROLLER BALL | ABC | RED | EXTRA FINE | US DOLLARS | 0.29 |
| ... | ... | ... | ... | ... | ... | ... |

FIG. 3

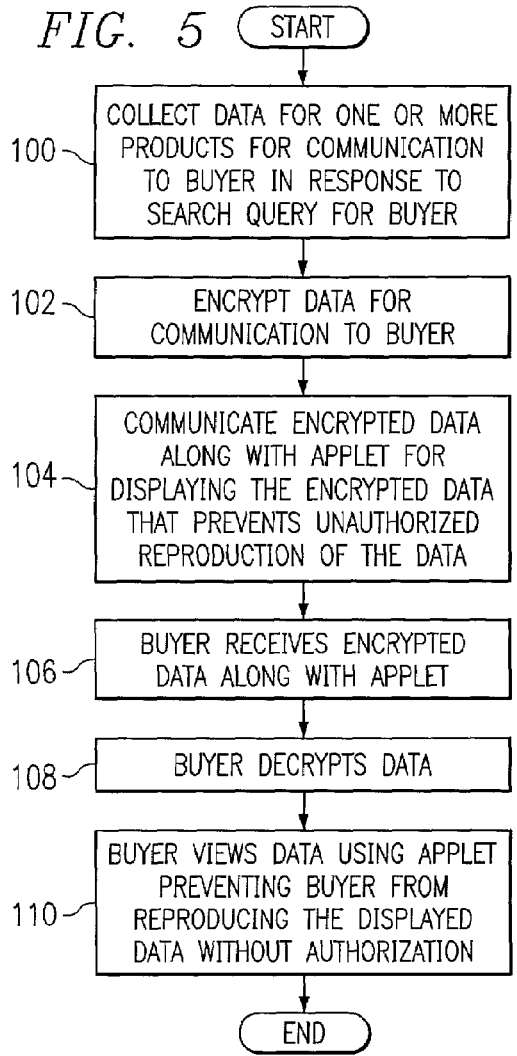
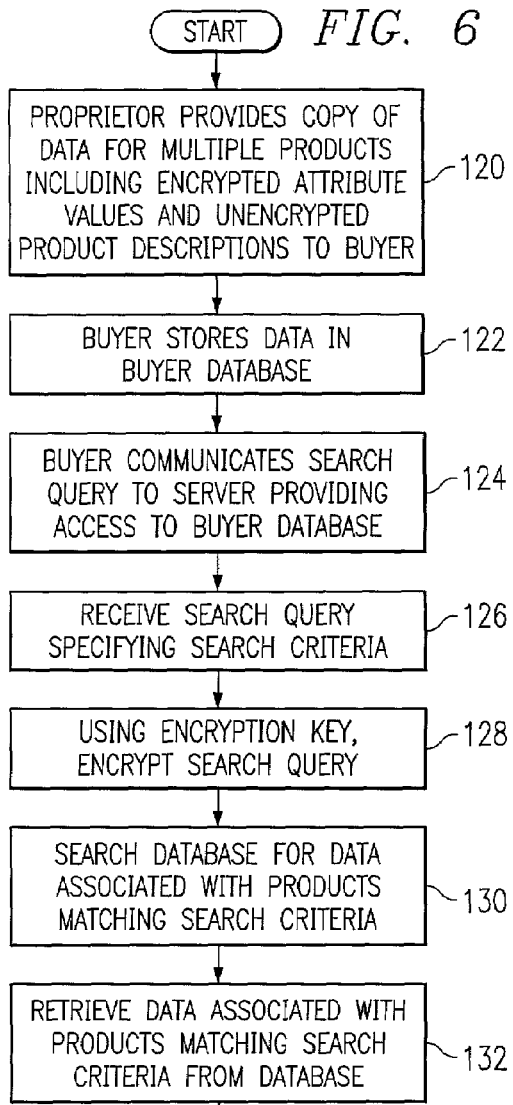
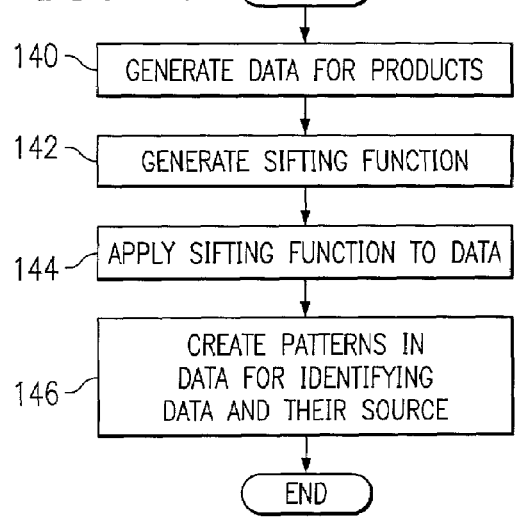

PROTECTING CONTENT FROM UNAUTHORIZED REPRODUCTION

BACKGROUND OF THE INVENTION

Due to the ever-increasing popularity and accessibility of the Internet as a medium of communication, the number of business transactions conducted using the Internet is also increasing, as are the numbers of buyers and sellers participating in electronic marketplaces providing a forum for these transactions. The majority of electronic commerce ("e-commerce") transactions occur when a buyer determines a need for a product, identifies a seller that provides that product, and accesses the seller's web site to arrange a purchase of the product. If the buyer does not have a preferred seller or if the buyer is purchasing the product for the first time, the buyer will often perform a search for a number of sellers that offer the product and then access numerous seller web sites to determine which seller offers certain desired product features at the best price and under the best terms for the buyer. The matching phase of e-commerce transactions (matching the buyer with a particular seller) is often inefficient because of the large amount of searching involved in finding a product and because once a particular product is found, the various offerings of that product by different sellers may not be easily compared.

SUMMARY OF THE INVENTION

According to the present invention, disadvantages and problems associated with previous e-commerce techniques have been substantially reduced or eliminated.

In one embodiment of the present invention, a computer-implemented system for protecting from unauthorized reproduction data associated with one or more products that is communicated over a communications network includes one or more servers. The servers collectively receive data associated with one or more products matching search criteria specified in a search query received from a buyer computer, the data having been collected in response to communicating the search query to one or more databases in which data associated with one or more products is stored. The servers collectively communicate to the buyer computer the data for the matching products and communicate a software component to the buyer computer, the software component operable to provide a user associated with the buyer computer access to the data for the matching products, the software component further operable to disable one or more tools supported at the buyer computer for reproducing the data.

Particular embodiments of the present invention may provide one or more technical advantages. For example, certain embodiments of the present invention may substantially prevent intended recipients of data for one or more products communicated over the Internet from making unauthorized reproductions of such data. Certain embodiments of the present invention may also substantially prevent unintended recipients of data for one or more products communicated over the Internet from making effective use of such data. Additionally, certain embodiments of the present invention may limit the amount of data for one or more products that may be accessed at one time when a search query is communicated from a buyer or an associated system.

Certain embodiments of the present invention may provide for encryption of certain portions of one or more databases (or entire databases) containing data for one or more products, which may substantially prevent effective use of unauthorized copies of the databases and, thereby, substantially discourage unauthorized reproduction of such data. In addition or as an alternative, one or more servers providing access to one or more databases containing product data may, in certain embodiments, require permission from the proprietor of the data to continue operation, which may substantially prevent effective use of unauthorized copies of the server hardware and/or software and thereby substantially discourage unauthorized reproduction of such hardware and/or software.

Certain embodiments of the present invention may provide for "watermarking" data for one or more products such that it may be determined with substantial certainty whether data from one source is actually a copy of data from another source. Such embodiments may allow a proprietor of data for one or more products to more easily determine whether unauthorized reproduction of its data has taken place. In addition, such embodiments may allow a proprietor of data to more easily prove that such reproduction has taken place.

Systems and methods incorporating one or more of these or other technical advantages may be well suited for modern e-commerce environments. Other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 3 illustrates an example table of a seller database;

FIG. 5 illustrates an example method for protecting data for one or more products communicated over a communications network from unauthorized reproduction;

FIG. 6 illustrates an example method for protecting data for one or more products in one or more databases from unauthorized reproduction; and FIG. 7 illustrates an example method for watermarking data for one or more products.

DETAILED DESCRIPTION OF EXAMPLE EMBODIMENTS

Figure 1:
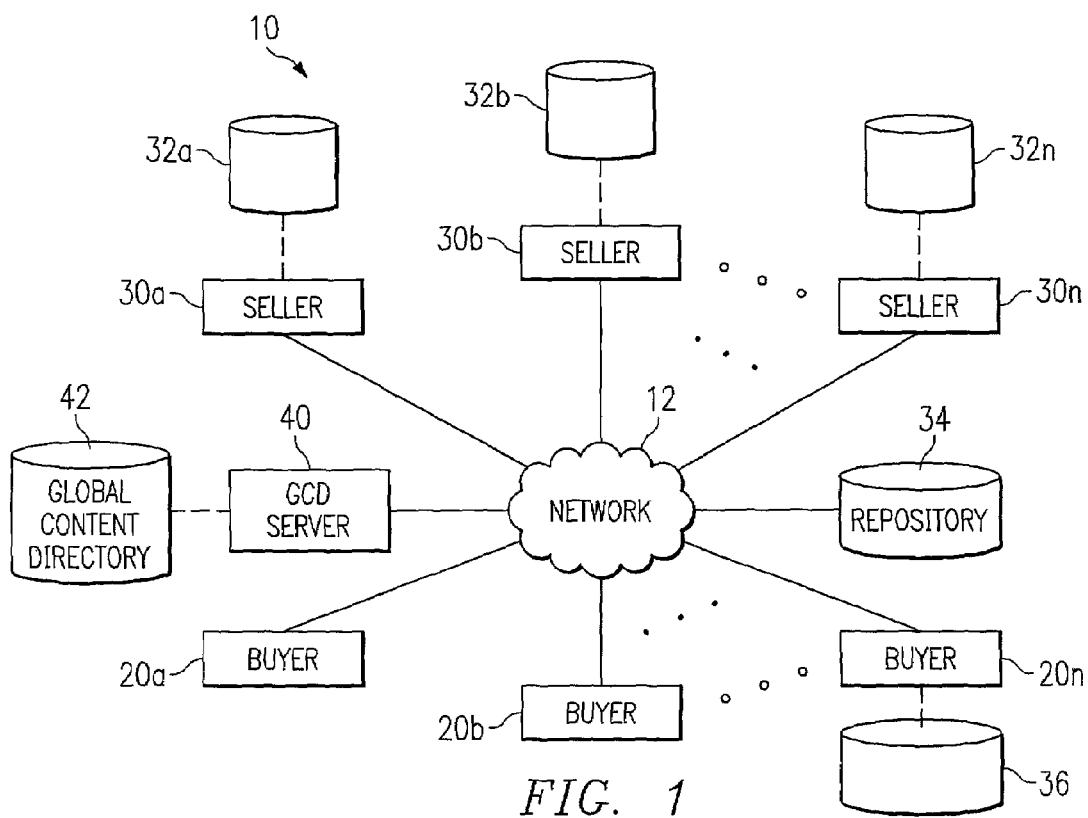
FIG. 1 illustrates an example e-commerce system.

FIG. 1 illustrates an example system 10 that includes a network 12 coupling buyers 20, sellers 30, and a global content directory (GCD) server 40. System 10 enables e-commerce transactions between buyers 20 and sellers 30 through the use of a GCD 42 supported by GCD server 40. Although GCD 42 is shown as being external to GCD server 40, GCD 42 may be internal or external to GCD server 40. Network 12 may include any appropriate combination of public and/or private networks coupling buyers 20, sellers 30, and GCD server 40. In an example embodiment, network 12 includes the Internet and any appropriate local area networks (LANs), metropolitan area networks (MANs), or wide area networks (WANs) coupling buyers 20, sellers 30, and GCD server 40 to the Internet. Since the Internet is accessible to the vast majority of buyers and sellers in the world, the present invention potentially includes all of these buyers and sellers as buyers 20 and sellers 30 associated with system 10. However, the use of the term "global" should not be interpreted as a geographic limitation necessarily requiring that GCD 42 provide directory services to buyers 20 and sellers 30 around the world (or in any other particular region) or that the content of GCD 42 be from all over the world (or from any other particular region).

Although buyers 20 and sellers 30 are described as separate entities, a buyer 20 in one transaction may be a seller 30 in another transaction, and vice versa. Moreover, reference to "buyer" or "seller" is meant to include a person, a computer system, an organization, or other entity where appropriate. For example, a buyer 20 may include a computer programmed to autonomously identify a need for a product, search for that product, and buy that product upon identifying a suitable seller. Although buying and selling are primarily described herein, the present invention contemplates any appropriate e-commerce transaction. Moreover, reference to "products" is meant to include goods, real property, services, information, or any other suitable tangible or intangible things.

Within example system 10, there may be a plurality of different databases. For example, associated with each seller 30 may be one or more seller databases 32, such as relational databases, containing data for one or more products available from that seller 30. Seller databases 32 may be accessed through a web site for the associated seller 30 or in any other appropriate manner, such as through GCD server 40, described more fully below. There may also be one or more shared data repositories 34 that may contain product data, seller data, and other data that may be combined with data from one or more seller databases 32, as described more fully below. There may also be one or more buyer databases 36 associated with a particular buyer 20, such as buyer 20*n*. Buyer database 36 may contain product data, seller data, and other data for a plurality of products available from one or more sellers 30. Buyer database 36 may provide buyer 20*n* a private "catalog" of products that buyer 20*n* may access directly without communicating with sellers 30 or GCD server 40. Buyer 20*n* may acquire the data within buyer database 36 for a fee or otherwise from one or more sellers 30, the entity operating repository 34, any other suitable entity. Additionally, there may restrictions on the use of such data by buyer 20*n*. For example, buyer 20*n* may only be authorized to use one copy of the data in database 36 or to use the data in database 36 for certain purposes.

A typical e-commerce transaction may involve a "matching" phase and a "transactional" phase. During the matching phase, a buyer 20 may search for a suitable product (meaning any good, real property, service, information, or other tangible or intangible thing that may be the subject of an e-commerce transaction) offered by one or more sellers 30, identify the most suitable seller 30 (which may involve, for example, identifying the seller 30 offering the lowest price), and contact that seller 30 to enter the transactional phase. During the transactional phase, the buyer 20 and seller 30 may negotiate a contract for the sale of the product (which may involve, for example, more clearly defining the subject of the transaction, negotiating a price, and reaching an agreement on supply logistics) and generate a legal document embodying the terms of the negotiated contract. To identify the most suitable seller 30 during the matching phase without the use of GCD 42, a buyer 20 may have to access numerous seller web sites to determine which seller 30 offers certain desired features of the product at the best price. As described above, sellers 30 may each provide one or more databases 32 that include data identifying the products available from sellers 30 and their features and that may be accessed through the associated seller's web site or in any other appropriate manner. The multiple one-to-one (one buyer 20 to one seller 30) searches that this process requires are inefficient and expensive because of the large amount of searching involved in finding a product and because the various offerings of that product by different sellers 30 may not be easily compared.

Alternatively, multiple sellers 30 may be grouped in an electronic marketplace according to the products they provide and a buyer 20 may search the offerings of the multiple sellers 30 at a single web site. However, if buyer 20 wishes to obtain several different types of products, buyer 20 may have to go to several different types of marketplaces. Furthermore, there may be numerous competing marketplaces that buyer 20 has to search to perform the matching phase of a transaction for a particular product. One potential method of addressing this problem is to create a global product database that potentially includes data identifying the features of all the products that any buyer may wish to obtain. Therefore, the global database would include the combined contents of every database 32 associated with every seller 30. However, such a global database would have many problems. For example, the sheer size of the database would make it difficult to search and cause the database to suffer from performance problems. In addition, it would be difficult to allow large numbers of buyers 20 to search the database at once. Furthermore, all sellers 30 would be required to access the global database to update their information and the entire database would have to be updated each time a change is made. Many other problems might also exist.

A solution to the above problems, at least in part, is GCD 42. GCD 42 is a universal directory of the contents of multiple seller databases 32 (and potentially all seller databases 32). GCD 42 may be implemented using one or more servers 40 or other computers located at one or more locations. Most or all of the content in these seller databases 32 remains stored in databases 32, but this content is accessible using GCD 42. Therefore, like the global database described above, GCD 42 provides buyers 20 with access to product data relating to a multitude of products (and potentially seller data relating to one or more sellers 30 of the products), but unlike the global database, GCD 42 does not attempt to store all of this data in one enormous database. Where appropriate, reference to "data" is meant to include product data (meaning information reflecting values for certain attributes of a product), seller data (meaning information reflecting values for certain seller attributes), both product data and seller data, or other data (such as vendor-specific product descriptions) that may be associated with one or more products.

GCD 42 provides a directory of products using a directory structure in which products are organized using a hierarchical classification system. A buyer 20 may navigate or search the directory to find a particular product class into which products are categorized. The product data (and potentially seller data) associated with a product included in a product class may actually be stored in and obtained by GCD 42 from a seller database 32. However, the requested data may be transparently provided to buyer 20 such that all of the product data may appear to buyer 20 as being included in GCD 42. Although product and/or seller data has primarily been described as being stored in seller databases 32, the present invention contemplates product data being stored in any suitable manner and being retrieved from any suitable sources. For example, system 10 may include a shared data repository 34 that contains product data and/or seller data that may be combined with data from one or more seller databases 32, as described in further detail below.

Figure 2:
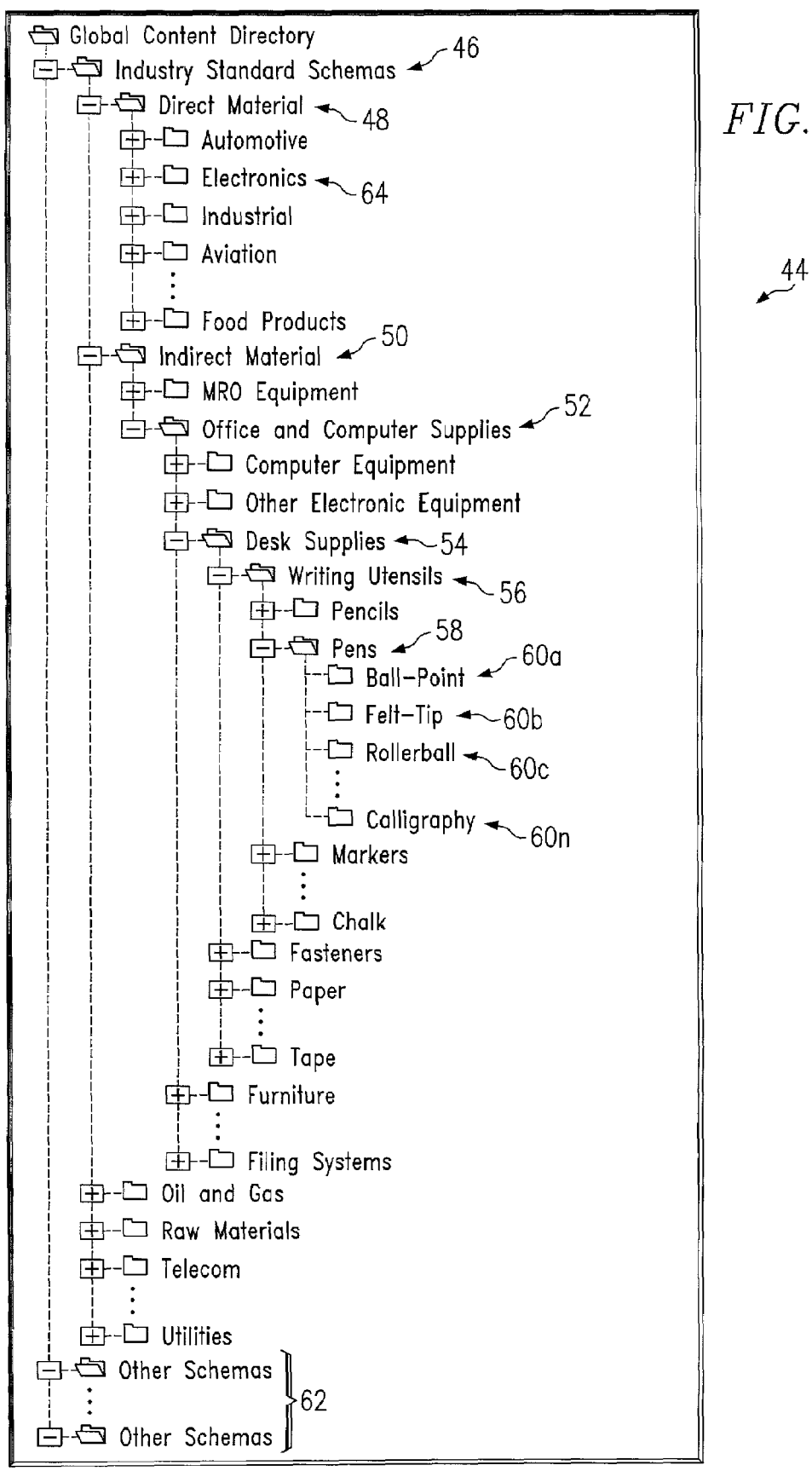
FIG. 2 illustrates an example directory structure of an example global content directory.

FIG. 2 illustrates an example directory structure 44 of an example GCD 42. Products categorized in GCD 42 may be organized according to schemas. A schema may include a set of product classes (which may be referred to as a "taxonomy") organized in a hierarchy, each class being associated with a set of product features, characteristics, or other product attributes (which may be referred to as a "product ontology"). For example, pens may have different kinds of tips (such as ball point or felt tip), different tip sizes (such as fine, medium, or broad), and different ink colors (such as blue, black, or red). Accordingly, a schema may include a class corresponding to pens that has a product ontology including tip type, tip size, and color, or other appropriate attributes. Within a class, products may be defined by product attribute values (such as, for example, ball point, medium tip, blue ink). Reference to "value" is meant to include any instance of a product attribute or a seller attribute. Product attribute values and seller attribute values may be represented by numbers, letters, figures, characters, symbols, or other suitable information for describing a product or a seller, respectively. In one embodiment, a product ontology may be divided into entry-required attributes (meaning attributes for which a value has to be provided) and entry-optional attributes (meaning attributes for which a value is optional), and these categories may be further divided into commercial features and design features (or any other suitable divisions).

In addition to a taxonomy and product ontologies, a schema may include a set of attributes for each seller (which may be referred to as a "seller ontology"). Such attributes may include geographic restrictions (such as served markets), currencies accepted by each seller, collaboration tools accepted by each seller, contract terms accepted by each seller, types of contracts accepted by each seller, levels of buyer credit required by each seller, and any other suitable seller attributes. Similar to a products within a product class, sellers offering products within a product class may be defined by seller attribute values corresponding to seller attributes. Accordingly, a schema may include a set of classes, each including one or more products, and each class may be associated with a set of product attributes and a set of seller attributes.

In example directory structure 44, products may be organized and cataloged according to industry standard schemas 46 or other appropriate schemas, as described below. Within industry standard schemas 46, there are two example classes: a direct materials class 48 and an indirect materials class 50. Each of these classes 48 and 50 includes several sub-classes (which may themselves include sub-classes). Therefore, the numerous classes of directory structure 44 form a "tree-like" hierarchical structure into which products may be categorized. For example purposes, certain portions of directory structure 44 are "expanded" in FIG. 2 to show various levels of classes. The "level" of a class is indicated by the number of other classes between that class and a root class (such as industry standard schemas class 46). For example, indirect material class 50 is at the same level in directory structure as direct material class 48. Indirect material class 50 may include an office and computer supplies class 52, which includes a desk supplies class 54, which includes a writing utensils class 56. Furthermore, writing utensils class 56 includes a pens class 58, which includes numerous pen type classes 60a-60n ("n" indicating that any number of classes 60 may be included in pens class 58). Each of classes 50, 52, 54, 56, 58, and 60 is located at a different level of directory structure 44. A class at any level in directory structure 44 may include one or more sub-classes, those sub-classes may include one or more sub-classes, and so on, until a desired specificity of categorization is reached. A series of classes from a highest level class (the broadest class) to a lowest level class (the most specific class) may be referred to as a "branch" of directory structure 44. For example, classes 46, 48, 50, 52, 54, 56, 58, and 60b form one branch of directory structure 44.

Although example directory structure 44 may use industry standard schemas 46 as described above, any other appropriate schemas 62 may be used in addition to or instead of industry standard schemas 46. For example, while industry standard schemas 46 may be organized from a seller's viewpoint, other schemas 62 may be used that organize products from a buyer's viewpoint. For example, a buyer 20 may wish to furnish a kitchen of a new house with various products, such as appliances, window treatments, paint, cabinetry, plumbing, dishes, and cooking utensils. Using one schema 62, these products may be organized into a variety of unrelated classes based on certain features of the products (for example, certain kitchen appliances may be categorized in an electronics class 52 of directory structure 44 while paint may be categorized into an industrial class 52). However, another example schema 62 may categorize all such products into a home products class (which may include several classes further categorizing the products, such as a kitchen products class which includes a kitchen appliances class, which includes a refrigerator class, and so on). Therefore, the same product may be included in multiple schemas 62. These alternative schemas may be included in directory structure 44 and may be stored as a part of or separate from GCD 42.

A buyer 20 may navigate through directory structure 44 by expanding or collapsing various classes as desired. For example, FIG. 2 illustrates an expansion of certain classes of directory structure 44 to reach a felt-tip pen class 60b. Once a buyer 20 has navigated to a class that is specific enough for buyer 20 (and/or a class that is at the end of a branch), buyer 20 may perform a search for products within that class. For example, buyer 20 can search for all products in writing utensils class 56 that are blue felt-tip pins having medium tips. Alternatively, if buyer 20 navigates to the end of a branch of directory structure 44, such as felt-tip pen class 60b, GCD 42 may then enable buyer 20 to search for such pens that have blue ink and medium tips (which may reach the same result as the search above).

Buyer 20 may also search for sellers matching one or more seller attribute values within a product class. For example, in addition to searching for all products in writing utensils class 56 that are blue felt-tip pins having medium tips, buyer 20 may search for sellers 30 serving Texas that accept U.S. dollars. Buyer 20 may search for products matching certain product attribute values and sellers matching certain seller attribute values in any appropriate manner. In one embodiment, for example, buyer 20 provides search criteria including both values for product attributes and for seller attributes (search criteria may instead be generated automatically, in whole or in part, as described below), and server 40 searches for products that match the product attribute criteria and are offered by sellers matching the seller attribute criteria. In another embodiment, buyer 20 provides only product attribute values as search criteria, and server 40 limits its search for products matching the product attribute values to databases 32 associated with sellers 30 known to match seller attribute values that buyer 20 may want according to a buyer profile or otherwise.

As described above, in one embodiment, product data (at least product data more detailed than data provided by a taxonomy) and seller data are not stored in GCD 42, but are stored in databases 32. For example, a seller 30 may maintain a relational database 32 that includes a plurality of tables containing product attribute values for a variety of products and seller attribute values for each product, a set of products, or all of the products offered by seller 30. Product data and seller data may be integrated into one or more tables or may be segregated into different tables. Moreover, product data and seller data for a seller 30 may be stored in the same or separate databases. One or more pointers may be associated with each class to identify the location of one or more databases 32 that include product data and/or seller data for products contained in that class or to identify particular data in databases 32. Therefore, GCD 42 may execute a search for products in databases 32 identified by a pointer corresponding to a user-selected (or automatically selected) class. GCD 42 may also return the network location (such as a uniform resource locator (URL) or other network address) of the database 32 to buyer 20 so that buyer 20 may independently access database 32. Databases 32 may be searched using any appropriate method including, but not limited to, a structured query language (SQL) query.

GCD 42 may be implemented using the lightweight directory access protocol (LDAP), which enables directories to be provided using the tree-like structure described above. However, any other appropriate technique or protocol for creating GCD 42 may alternatively be used and GCD 42 may have any appropriate structure. Furthermore, GCD 42 may be an object-oriented directory (which is also provided by LDAP) such that each class in directory structure 44 includes the attributes of parent classes in which the class is a sub-class. In this embodiment, a product class listed at the end of a branch of the tree structure includes all of the attributes of its parent classes in the branch. Furthermore, each product included in a database 32 may be an object that includes all the attributes of the classes in which the product is included. Thus, when a search is performed from a class at the end of a branch of directory structure 44, the search query may automatically include any appropriate attributes of parent classes of the class.

For example, if a buyer 20 has navigated through directory structure 44 to felt-tip pens class 60*b*, a search performed by buyer 20 (or by GCD 42 on behalf of buyer 20) from felt-tip pens class 60*b* may automatically be limited to a search for felt-tip pens and buyer 20 may introduce additional desired search criteria (such as blue ink and medium tip). Therefore, if a database 32 searched includes product data relating to a variety of writing utensils, a search of database 32 may be automatically limited by GCD 42 to only include felt-tip pens within that database 32. Buyer 20 may also identify additional product attribute values and/or seller attribute values as additional search criteria.

When GCD 42 has performed a search of the databases 32 identified by a pointer or pointers associated with a class that buyer 20 has selected (or that has been automatically selected), GCD 42 may return product data and/or seller data associated with one or more products matching the search criteria. GCD 42 may integrate the product data and/or seller data resulting from the search into directory structure 44 so that the data appears to buyer 20 as being part of GCD 42. GCD 42 may alternatively present the results of the search in any other appropriate manner. Each product resulting from the search may be an object which is unique instance of the class in which buyer 20 is searching. Furthermore, each such object (and its location) may be uniquely identified using a numbering scheme corresponding to directory structure 44.

In summary, a buyer 20 may search for a product matching certain product attribute values available from a seller matching certain seller attribute values using GCD 42 and thus eliminate or reduce the need for buyer 20 to individually search numerous seller databases 32 to find the desired product available from a suitable seller. GCD 42 provides access to product and/or seller data relating to these numerous products using directory structure 44, which organizes products using a hierarchical, object-oriented classification system. Buyer 20 may navigate or search directory structure 44 to find a particular classification of products and various information associated with the products within this classification, initiate a search of databases 32 including product and/or seller data relating to a product, and then communicate with an appropriate database 32 through GCD server 40 or otherwise. Such access to vast numbers of products is provided without the requirement that all data about the products and/or sellers be stored in a global database. Instead, this data may be stored in seller databases 32 that can be readily accessed using GCD 42.

One problem that may be associated with the use of the various seller databases 32 is that these databases 32 may include product data about the same class of product (for example, felt-tip pens), but may identify products of that class using different attribute values, may use different names for the same product attribute value, and/or may quantify or distinguish product attribute values differently (using different units of measurement, for example). The same may be true for seller data that may be contained in databases 32. Some of these issues may be solved using translation mechanisms that convert the data into a uniform format used by GCD 42. Alternatively, sellers 30 may create new databases 32 or manually modify existing databases 32 (or may hire a third party to create or modify databases 32) to conform to a uniform standard in anticipation of a database 32 being used in association with GCD 42.

One disadvantage to seller 30 (or a third party) creating data that is appropriate for use with GCD 42 is that the generation of such data is typically expensive and time-consuming. If seller 30 has already created product data (for example, for access by buyers 20 using the seller's web site), seller 30 may be reluctant to repeat the process and expense of recreating, expanding, reformatting, translating, or otherwise modifying existing product data into a format appropriate for use with GCD 42. However, if seller 30 does not properly format its product data and instead uses a pre-existing data format in conjunction with GCD 42, the seller's product data may not be properly associated with GCD 42 and seller 30 may be disadvantaged during the matching phase of a transaction. For example, if the product ontology associated with pens class 58 in directory structure 44 includes ink color as a product attribute and seller 30 does not have this information in its product data or does not refer to this information as "ink color" in its database 32, then a search conducted using GCD 42 for pens having a particular ink color may not properly identify products in database 32 that meet the search criteria. Alternatively, the seller's products may be identified in the search results, but may be ranked lower in the search results since seller 30 does not provide information about the ink color or does provide the information but does not format the information appropriately for use with GCD 42.

One solution to the above problem is to provide a shared product data repository 34 that includes product data relating to numerous common products and which is properly formatted and complete for use with GCD 42. The product data in repository 34 may be made available, for a fee or otherwise, to sellers 30 who do not wish to create (or pay a third party to create) product data for use with GCD 42 or recreate, expand, reformat, translate, or otherwise modify existing product data for use with GCD 42. As an example only, although hundreds of sellers 30 participating in system 10 may sell pens, there may be only a few manufacturers that make the pens sold by sellers 30. Therefore, it may be more efficient and cost effective for the manufacturers to create much of the product data for the pens that they produce and provide this data in repository 34 instead of each seller 30 creating redundant product data for the pens. Alternatively, the product data in repository 34 may be created by an entity associated with GCD 42 or any other appropriate entity.

Product data relating to a particular product that is not seller-specific and/or that changes relatively infrequently (compared to "dynamic" product data, described below) may be created by the manufacturer or another entity and stored in repository 34 for use by sellers 30. This data may be referred to as "static" product data. Examples of static product data relating to a pen may include data relating to ink color, tip type, and tip size of the pen. Other product data relating to a product that is seller-specific and/or that changes relatively frequently (compared to "static" product data) may be created by sellers 30 and stored in seller databases 32. This data may be referred to as "dynamic" product data. Examples of dynamic product data relating to a pen may include data relating to the price, availability, and lead time associated with the pen. Optimally, the combination of the static and dynamic data relating to a particular product will include values for each of the product attributes included in the product ontology of the classes of GCD 42 in which the product is classified. For example, pens class 58 in GCD 42 may have an associated product ontology that includes ink color, tip type, tip size, price, availability, and lead time attributes. Preferably the combination of static product data in repository 34 and dynamic product data in a seller database 32 relating to the pen includes values for each of these product attributes.

When a seller 30 wishes to sell a product using GCD 42, the seller 30 may first determine whether repository 34 includes static product data for the product. Seller 30 may obtain information regarding what product data is included in repository 34 by querying GCD server 40, by querying an entity associated with the repository 34, by directly accessing repository 34, or using any other appropriate technique. If static data for the particular product or products is included in repository 34, then seller 30 may request that the static product data be associated with seller 30 and one or more of its products. As described above, one or more pointers may be associated with each class to identify the location of one or more seller databases 32 that include product data for products contained in that class or to identify particular data in databases 32. In addition, pointers associated with a class may identify the location of a repository 34 and may identify particular data in repository 34. Furthermore, one or more pointers to repository 34 may be linked to one or more pointers to a seller database 32 such that the information from the seller database 32 and repository 34 may be merged. Alternatively, the static product data in repository 34 may be linked with one or more sets of dynamic product data in one or more seller databases 32. Dynamic product data from seller database 32 may be merged with static product data from repository 34 and the combined data may be provided to a buyer 20 as a result of a product search.

Although repository 34 is illustrated as a single storage location, repository 34 may include multiple storage locations at the same or different physical locations. Any appropriate number of storage locations located in a number of physical locations may be used (for example, the storage locations may be distributed in various geographic regions). GCD server 40 may search each of these distributed repositories 34 as appropriate to obtain static product data that is responsive to a buyer's search. Alternatively, pointers associated with a class may direct GCD server 40 to one or more particular storage locations. In addition, if multiple repositories 34 are used, each repository 34 may include identical product data, some common and some different product data, or entirely different product data. Furthermore, repository or repositories 34 may store the product data in any appropriate format using any appropriate storage medium. Moreover, it should be noted that although shared product data repository is described as including static product data, seller databases 32 may also include static product data. This static product data may or not be made available to buyers 20 using GCD 42.

FIG. 3 illustrates an example table 150 that may be included in a seller database 32 and/or repository 34. Database 32 and repository 34 may include one or more tables 150, and each table 150 may contain data relating to one or more products. For example, example table 150 includes data relating to different types of pens. Table 150 may also include data for other types of products (for example, other types of office supplies), or such data may be contained in other tables 150 in database 32 and/or repository 34. Table 150 includes a plurality of columns 152 that each include data relating to a particular product attribute or seller attribute. Although an example number of columns 152 including example product attribute values and seller attribute values are illustrated, it should be understood that any appropriate number and type of product attributes, seller attributes, or other categories of data may be included in table 150. Moreover, as described briefly above, seller data and product data may be segregated into different tables instead of being integrated into the same table as shown in example table 150.

Table 150 also includes a number of rows 154 that may each correspond to a particular product and that each include values for one or more of the product attributes and seller attributes. Each of the values (which may be numeric, textual, or in any other appropriate format) is located at the intersection of the row 154 associated with a particular product and the column 152 that includes a particular product attribute or seller attribute. Each of these intersections may be referred to as a field or cell 156 of table 150. Where seller data and product data are integrated, each row 154 may contain all of the product data and seller data for the product corresponding to that row 154. Alternatively, there may be a row or set of rows dedicated to seller data that may apply to all products offered by a seller 30 or a subset of all such products. Where seller data and product data are segregated, each row in the seller data table may correspond to a set of seller attribute values that may be linked to a set of one or more products in the product data table such that seller data for a product may be accessed when product data for that product is accessed, and vice versa.

The data in one or more columns 152 of table 150 may be indexed to increase the speed with which database reads may be conducted. For example, the fields 156 of ink color column 152d and tip size column 152e may be indexed so that a database query for a pen having a particular ink color and tip size may be quickly performed. Data in table 150 may be indexed using any appropriate database indexing technique. The typical result of such indexing is that when GCD 42 or a buyer 20 requests indexed data from a database 32 and/or repository 34, the associated database management system (or other appropriate interface to database 32 and/or repository 34) does not have to search through every field 156 in the tables 150 included in database 32 and/or repository 34 to locate the requested data. Instead, the data may be indexed such that when a query is submitted for products having certain product attribute values and/or sellers 30 having certain seller attribute values that have been indexed, the database management system already knows the locations of such products in table 150 and may return data associated with these products without searching the entire table 150 or database 32 and/or repository 34 for the products. For example, if the ink color fields 156 and tip size fields 156 of columns 152d and 152e, respectively, are indexed, the index will typically identify the location of all products having black ink and a medium tip size.

If a query is submitted that also specifies a value of one or more non-indexed product attributes (for example, a query for pens manufactured by ABC Company, if the manufacturer fields 156 in column 152c are not indexed) and/or seller attributes, then the associated database management system may perform a search of database 32 and/or repository 34 for products that include the specified value of the one or more non-indexed attributes or seller attributes. However, such a search may be limited to the products already identified (using the index) as including specified values of indexed attributes (for example, pens having black ink and a medium tip) and/or seller attributes that are also included in the search. Therefore, the amount of time required to perform the search may be reduced even though one or more of the product attribute values or seller attribute values that are searched for are not indexed.

Figure 4:
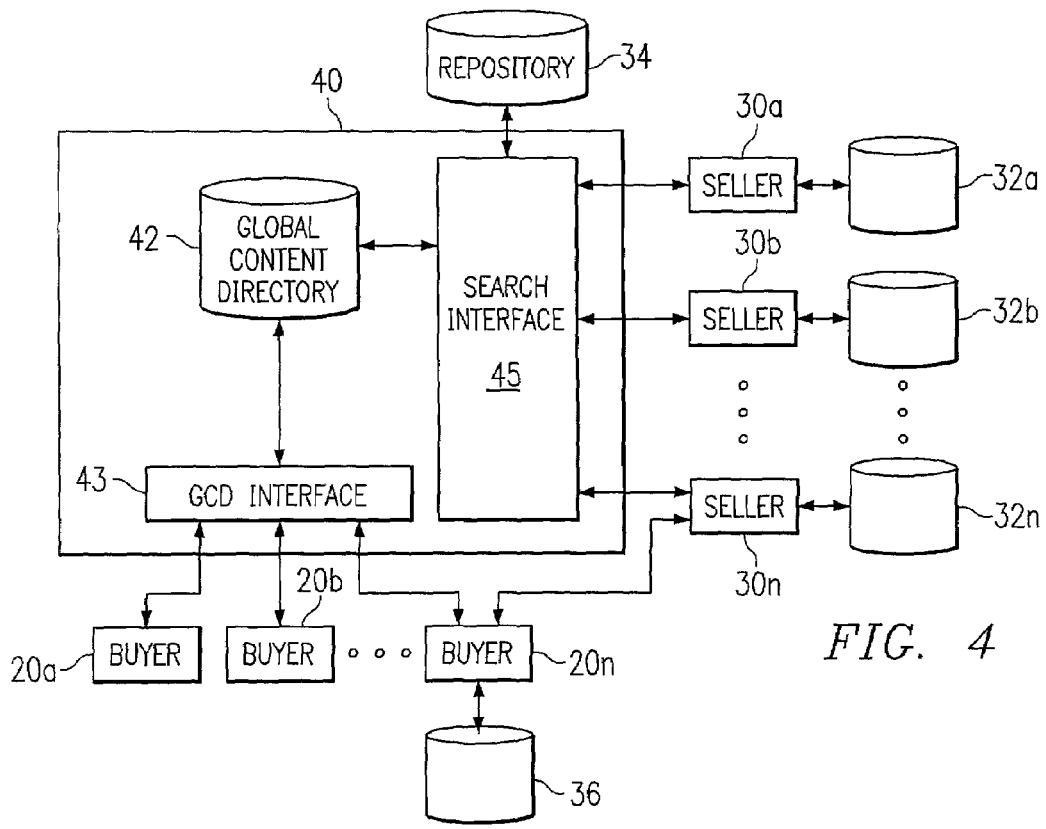
FIG. 4 illustrates an example e-commerce system in further detail.

FIG. 4 illustrates an example e-commerce system 10 in further detail. As described above, numerous buyers 20 and sellers 30 may be coupled to GCD server 40 using network 12. Buyers 20 may access server 40 using a web browser or in any other appropriate manner and server 40 may provide buyers 20 with access to GCD 42 using a web server or in any other appropriate manner. Although GCD 42 is shown as being internal to GCD server 40, GCD 42 may be internal or external to GCD server 40, as described above. GCD server 40 may also include hardware and/or software for implementing one or more GCD interfaces 43. A buyer 20 may access server 40 and use a GCD interface 43 to search or navigate GCD 42 and/or seller databases 32. Information may be communicated among buyers 20, sellers 30, and GCD 42 using hypertext transport protocol (HTTP), extensible markup language (XML), simple object access protocol (SOAP), or any other suitable communication technique. Each buyer 20 and seller 30 may be issued a unique identifier so that the participants in a transaction facilitated by GCD 42 may be identified. Each buyer 20 and seller 30 may also be assigned a role with respect to a transaction. As described above, a buyer 20 in one transaction may be a seller 30 in another transaction, and vice versa.

In an example transaction, a buyer 20 may access a GCD interface 43 and perform a search of GCD 42. GCD interface 43 may allow buyer 20 to both navigate or "browse" the classes of GCD 42 and to search for a particular class or classes. For example, buyer 20 may either navigate GCD 42 to find a class into which pens are categorized or buyer 20 may search GCD 42 for class names including the word "pen." Any other suitable methods for identifying a particular class may also be used. When buyer 20 has located the appropriate class for the product buyer 20 desires, buyer 20 may then request a listing of products in that class matching certain product attribute values. For example, if buyer 20 is browsing felt-tip pens class 60b, buyer 20 may request all products in class 60b (felt-tip pens) that have red ink and a fine tip and that are sold by a seller 30 located in the United States.

A search interface 45, or any other appropriate component of GCD server 40, may facilitate such a request by searching or requesting searches of repository 34 and/or seller databases 32 identified by one or more pointers associated with felt-tip pens class 60b, as described above. Search interface 45 may provide buyer 20 a search form in which to enter one or more search criteria. The types of search criteria that may be used may be identified in the search form, or buyer may be allowed to perform a general search of databases 32 and/or repository 34 for certain terms. For example, search interface 45 may provide buyer 20 with a search form tailored for class 60b that includes fields where buyer 20 can specify a desired ink color, tip thickness, or any other appropriate product-related or seller-related criteria. In one embodiment, the fields of the search form correspond to some or all of the product attributes within the product ontology and/or seller attributes within the seller ontology corresponding to the product class that has been selected, and buyer 20 may enter values for the product attributes and seller attributes in the corresponding search form fields. In lieu of a search form, search interface 45 may instead provide a single field where buyer can enter in desired search terms, such as "red" and "fine" (multiple search terms may be entered using Boolean operators or any other appropriate technique).

Search interface 45, or any other appropriate component of GCD server 40, may also facilitate search requests by accessing a buyer profile for buyer 20 containing information compiled from previous search requests made by buyer 20, previous e-commerce transactions involving buyer 20, or other events or actions on the part of buyer 20. For example, a buyer profile may contain a list of sellers 30 matching seller attribute values that buyer 20 may want. Such a list may be compiled from the results of previous searches by buyer 20. Search interface 45 may access the profile for buyer 20 for any suitable purpose. In one embodiment, search interface 45 may access the profile for buyer 20 to automatically generate search criteria, such as product attribute values and/or seller attribute values, for a search. Search interface 45 may also access the profile for buyer 20 to limit its search for products matching product attribute values provided by buyer 20 (or generated automatically) to databases 32 associated with sellers 30 known to match seller attribute values that buyer 20 may want (and/or data in repository 34 associated with such sellers 30).

Based on search criteria provided by buyer 20 or generated automatically, search interface 45 may communicate a query to the appropriate seller database(s) 32 and/or repository 34 requesting that databases 32 and/or repository 34 each return a listing of all products (including associated product data and/or seller data) that meet the search criteria. Databases 32 and/or repository 34 may also return data relating to attribute values that were not included in the search criteria. For example, databases 32 may return a price and availability for products that meet the search criteria even if price and availability were not search criteria. Responses to the queries of databases 32 and/or repository 34 (which may be referred to as "search results") may be displayed to buyer 20 in any appropriate manner. In one embodiment, search results are communicated directly to buyer 20 from databases 32 and/or repository 34. In another embodiment, GCD 42 lists search results in order of relevance to the search criteria according to suitable matching criteria and presents the results to buyer 20. GCD 42 may also sort the search results according to one or more "default" sort criteria, a sort request made by buyer 20, or one or more buyer preferences recorded in a buyer profile associated with buyer 20. For example, buyer 20 may request that the matching products be listed in order from least expensive to most expensive.

GCD 42 may also sort search results according to content type. For example, GCD 42 may sort search results such that products for which data was received from repository 34 may be presented to buyer 20 first, products for which data was received from seller databases 32 containing content known to match the schema and ontologies of GCD 42 may be presented second, and products for which data was received from seller databases 32 containing content not known to match the schema and ontologies of GCD 42 may be presented third. Within each of these data groups, products may be listed in any suitable order, such as in order of price or any other suitable attribute. For example, search results may be displayed such that products for which data was received from repository 34 may be presented first in order of price, products for which data was received from seller databases 32 containing content known to match the schema and ontologies of GCD 42 may be presented second in order of price, and products for which data was received from seller databases 32 containing content not know to match the schema and ontologies of GCD 42 may presented third in order of price. Although particular examples of displaying search results have been described, search results may be displayed in any suitable order and may be sorted according to any suitable criteria.

Buyer 20 may select a product from the product listing to enter the transactional phase of the e-commerce transaction involving the buyer. During the transactional phase, as described above, the buyer 20 and seller 30 may negotiate a contract for the sale of the product (which may involve, for example, more clearly defining the subject of the transaction, negotiating a price, and reaching an agreement on supply logistics) and generate a legal document embodying the terms of the negotiated contract.

On selection of a product by buyer 20, GCD 42 may communicate a repository identifier (RID) identifying the selected seller 30 and a globally unique identifier (GUID) for the product to buyer 20. For example, an RID may be the network address (such as an IP address) of a seller network node 30 or may be associated with the network address in a table (in which case GCD 42 may use the RID to look up the associated network address and then communicate the network address to buyer 20). Buyer may access the seller 30 using the RID (or network address) and request a transaction regarding the product using the GUID. GCD 42 may even provide a link including a URL of a web site associated with the seller 30 or may provide another appropriate method for buyer 20 to be connected to seller 20. Although only a single example arrow (between buyer 20n and seller 30n) is shown to illustrate communication between buyers 20 and sellers 30, it should be understood that any buyer 20 may communicate with any seller 30 to conduct appropriate transactions.

Generating data for seller databases 32, repository 34, or buyer database 36 enabling one or more buyers to efficiently search for certain products and/or sellers 30 may be costly and time-consuming. As a result, a proprietor of such data may want to prevent others from reproducing such data without authorization. Reference to "proprietor" may include any suitable entity, such as an enterprise, that may have some form of ownership rights in data. Preventing such reproduction may be especially important where the data is being communicated over the Internet (or other suitable communications network) or copies of the data are provided to others for certain limited uses.

For example, data may be communicated over the Internet from a seller database 32 or other data source in response to a search query from a buyer 20. The proprietor of such data may substantially protect the data from unauthorized reproduction or other unauthorized use by encrypting the transmitted data and, additionally or as an alternative, requiring the use of an applet, plug-in, or other suitable software component to view or otherwise access the data. Encrypting transmitted data may substantially prevent an unintended recipient from making effective use of the data, while requiring the use of an applet, plug-in or other suitable software component to view or otherwise access the data may substantially prevent an intended recipient from reproducing the data without authorization. Data may be encrypted at its source (or associated location) and decrypted at its destination (or associated location) using any suitable encryption technique, such as, for example, public key encryption.

An applet, plug-in, or other suitable software component for viewing or otherwise accessing the data may, while providing access to the data for certain purposes, prevent unauthorized reproduction of the data by, for example, disabling tools such as "cutting and pasting," "screen dumping," printing, and other tools for reproducing data. The software component may, in addition or as an alternative, regulate the amount of data that may be viewed or otherwise accessed at one time (in terms of, for example, the number of products for which data is made accessible). For example, the software component may limit the number of products for which data may be received by a browser or other application used by buyer 20. The software component may also limit the number of products for which data may be viewed at one time. In this way, the software component may increase the number of steps that might be involved in copying data for a large number of products, which may increase the time and difficulty associated with reproducing large amounts of data received by buyer 20 and, thereby, substantially discourage buyer 20 from trying to reproduce the data without authorization.

As described above, a proprietor of data may provide one or more copies of the data, for a fee or otherwise, to others for certain limited uses. For example, seller 30a, which may be the proprietor of the data in seller database 32a, may provide buyer 20n a copy of the data in seller database 32a, which copy buyer 20n may store in buyer database 36 such that buyer 20n may, as described above, directly access data for products available from seller 30a without communicating with seller 30a or GCD server 40. Similarly, the proprietor of the data within repository 34 may provide buyer 20n a copy of the data within repository 34. As further described above, there may be restrictions on the use of such data by buyer 20n. For example, buyer 20n may only be authorized to use one copy of the data or use the data for certain purposes. Therefore, the proprietor of data stored in buyer database 36 may want to protect the data within buyer database 36 from unauthorized reproduction. Although particular reference has been made to buyer database 36, the present invention is not limited to data within a database particularly associated with a buyer 20 or used for a particular purpose, but contemplates data being provided to any suitable entity at any suitable location for any suitable purpose.

Some or all of the data provided to buyer 20n and stored within buyer database 36 may be encrypted to substantially prevent effective use of unauthorized copies of the data and, thereby, substantially discourage buyer 20n (or others) from reproducing the data without authorization. Encryption of all of the data may have certain drawbacks, such as, for example, increased overhead requirements associated with searching for information on certain products within buyer database 36 and communicating search results to buyer 20n. Encrypting only some of the data may tend to solve at least some of these problems. Data stored in buyer database 36 may be encrypted and decrypted using any suitable technique. For example, access to the data within buyer database 36 may be provided by one or more servers using a "key" to decrypt the content of buyer database 36 and/or encrypt search queries run against buyer database 36. These servers may be integral to or distinct from buyer database 36 and may provide access only to buyer database 36. The key may be protected, using a suitable technique, from being copied or otherwise reproduced. It may therefore be difficult to search a copy of the data in buyer database 36 without the key, since the contents of the copy of buyer database 36 may not be decrypted and search queries run against them may not be encrypted. For these and other reasons, encrypting data provided to buyer 20n may substantially discourage buyer 20n (and others) from reproducing the data without authorization from the proprietor of the data.

As an example, product descriptions within buyer database 36 may be encrypted, while the attribute values for the products associated with those product descriptions may be left unencrypted. A product description may include text providing a seller-specific description of an associated product, which description may be more understandable than a corresponding set of product attribute values. In such an embodiment, buyer database 36 may be searched for products matching certain attribute values specified in a search query for buyer 20n without encrypting the search query or decrypting the attribute values within buyer database 36, but product descriptions for products matching the attribute values may have to be decrypted to be understood by buyer 20n. In this way, buyer 20n (or others) may be unable to effectively use a copy of the data within buyer database 36 without the key for decrypting the product descriptions. As another example, product descriptions within buyer database 36 may be left unencrypted, while the corresponding values for one or more attributes may be encrypted. For example, values for product attributes for which a value is commonly searched may be encrypted, while the values for product attributes for which a value is not commonly searched may be left unencrypted. Alternatively, all of the attribute values within buyer database 36 may be encrypted.

Where attribute values are encrypted, buyer database 36 may be searched for products matching certain attribute values specified in a search query from buyer 20n by encrypting the portions of the search query specifying attribute values for attributes for which values are encrypted. The unencrypted portions of the search query are searched against the unencrypted portions of the databases and the encrypted portions of the search query are searched against the encrypted portions of the databases. The values in the search query may be encrypted using the same encryption technique used to encrypt the data in buyer database 36 so that encrypted search values will match corresponding encrypted data in database 36. The results of the search may then be merged, and encrypted information corresponding to the search results may be decrypted before being communicated to buyer 20n. In this way, buyer 20n may be unable to effectively search the contents of buyer database 36 without the key for encrypting search queries and decrypting attribute values, substantially preventing buyer 20n (or others) from making effective use of copies of data within buyer database 36. In addition to the techniques described above, buyer database 36 may be divided into two halves, one of the halves containing encrypted data and the other containing unencrypted data, which may facilitate searches and the communication of search results to buyer 20n.

As discussed above, there may be one or more servers providing access to buyer database 36. To substantially prevent effective use of unauthorized copies of hardware and/or software associated with these servers, the servers may periodically or otherwise require permission from the proprietor of the data stored in buyer database 36 to continue operation. If the required permission is not granted, the servers may discontinue operation, preventing buyer 20n (or others) from accessing the data within buyer database 36. For example, the servers may request permission to continue operation from the proprietor of the hardware, software, and database content that collectively provide access to the data provided to buyer 20n. Such permission may be requested periodically, such as, for example, once a month. If the required permission is not received in response to the permission request, the server may discontinue operation until suitable permission is received or some other event occurs. Permission may, in addition or as an alternative, be required after the databases have been accessed a certain number of times or on another suitable basis. Permission may be granted or withheld according to the Internet Protocol (IP) address of the servers making the permission request. For example, the proprietor of the hardware, software, and database content that collectively provide access to the data stored in buyer database 36 may keep a record of the IP addresses of the servers associated with buyer 20n that are authorized to provide access to buyer database 36. When a permission request is received from an IP address corresponding to one or more servers authorized to provide database access, permission may be granted. On the other hand, when a permission request is received from an IP address not corresponding to one or more servers authorized to provide database access, permission may be withheld.

Additionally, a proprietor of data may want to "watermark" its data such that it may be determined with substantial certainty whether data from another source is a copy of the proprietor's data. Determining whether data from one source is a copy of data from another source may be important in determining whether unauthorized reproduction of certain data has taken place or proving that such reproduction has in fact taken place. Data found to contain one or more particular watermarks may be identified as a copy of data from a proprietor that uses those watermarks. In this way, the original source of the data may be identified. Data may be watermarked by one or more sifting functions or other suitable algorithms that may create identifiable "signature" patterns in the data. In certain embodiments, a sifting function may create a signature pattern in data stored in a database by making insertions, deletions, and/or alterations of printable American Standard Code for Information Interchange (ASCII) characters or other items in the data according to a distinct pattern. The insertions, deletions, and/or alterations made by the sifting function may be such that they do not interfere with searches against the data, change the meaning of certain data, or otherwise adversely affect the data or their use. As an example, a sifting function may capitalize every tenth lower-case instance of certain letters (or other suitable characters) moving left to right and down within a relation database. As another example, a sifting function may insert hyphens between words or other character groups within certain data fields within a database. As another example, a sifting function may underscore certain instances of text or other characters within a database. As another example, columns not containing any information (or not containing information that may interfere with searches against the data) may be inserted according to a distinct pattern. Although particular examples of signature patterns using printable ASCII characters have been described herein, the present invention contemplates any suitable pattern or combination of patterns that may be used to identify data and their source.

In addition or as an alternative, a sifting function may create a signature pattern in data within a database by making insertions of non-printable ASCII characters or other items in the data according to a distinct pattern. The insertions made by the sifting function may be such that they do not interfere with searches against the data, change the meaning of certain data, or otherwise adversely affect the data or their use. As an example only and not by way of limitation, such a sifting function may insert one or more particular non-printable ASCII characters after each instance of certain words or other character groups or in between the same. The inserted characters may be "hidden" such that they do not appear when the data is displayed, printed, or otherwise made available for viewing, but their presence among the data may be detected by, for example, an appropriate application to identify the data and their source.

In addition to watermarking data, a "checksum" technique may be used in combination with any suitable watermarking technique to further identify data and their source. For example, the sum of the numerical values of bytes representing product and/or seller data within a database, such as buyer database 36, or a suitable portion thereof, may be compared with the sum of the numerical values of bytes representing product and/or seller data from another source. Where these sums are at least substantially the same, it may be assumed that the data from the other source is, at least in part, a copy of the data from buyer database 36.

FIG. 5 illustrates an example method for protecting data for one or more products communicated over a communications network from unauthorized reproduction. The method begins at step 100, where GCD server 40 collects data for one or more products for communication to a buyer 20 over the Internet in response to a search query for buyer 20. Although GCD server 40 is particularly described with reference to FIG. 5, any suitable component of system 10 may be used in lieu of or in combination with GCD server 40. Additionally, data may be communicated over any suitable communications network in lieu of or in combination with the Internet, and data may be communicated to any suitable entity associated with or unassociated with buyer 20 for any suitable purpose. At step 102, GCD server 40 encrypts the data for communication to buyer 20 using a suitable encryption technique or combination of techniques. GCD server 40 communicates, at step 104, the encrypted data along with an applet (or other suitable software component) for displaying the encrypted data. Buyer 20 receives the encrypted data and applet from GCD server 40 at step 106 and, at step 108, decrypts the data using a suitable decryption technique. At step 110, buyer 20 views the data using the applet, which prevents buyer 20 from copying the displayed data, and the method ends.

FIG. 6 illustrates an example method for protecting data for one or more products within one or more databases from unauthorized reproduction. The method begins at step 120, where the proprietor of data for one or more products provides a copy of the data that includes encrypted product and/or seller attribute values and unencrypted product descriptions to buyer 20n. Buyer 20n stores the data in one or more buyer databases 36 at step 122 for use as a private catalog of products available from one or more sellers 30. At step 124, buyer 20n communicates a search query specifying one or more attribute values as search criteria to a server associated with buyer database 36 providing access to buyer database 36. The server receives the search query at step 126 and, at step 128, encrypts the attribute values specified in the search query using a suitable encryption key such that the search query may be run against the encrypted data within buyer database 36. The server runs the encrypted search query against the encrypted attribute values within buyer database 36 at step 130 and retrieves data associated with products matching the specified attribute values at step 132. By encrypting the search query instead of decrypting the data within buyer database 36 to search buyer database 36, the required overhead associated with searching buyer database 36 for information on certain products may be reduced. Using the encryption key, the server decrypts the encrypted attribute values for the products matching the specified attribute values at step 134. At step 136, the server communicates to buyer 20n the decrypted attribute values for the products matching the specified attribute values along with the unencrypted product descriptions for those products, and the method ends.

FIG. 7 illustrates an example method for watermarking data for one or more products. The method begins at step 140, where data for one or more products is generated. At step 142, a sifting function for creating predefined patterns in the data is generated. The sifting function is applied to the data at step 144. As described above, the sifting function may create any suitable pattern or combination of patterns for identifying the data and their source without adversely affecting the use of the data. For example, the sifting function may alter printable ASCII characters in the data according to one or more patterns. In addition or as an alternative, the sifting function may insert non-printable ASCII characters into the data according to one or more patterns. At step 146, the predefined patterns are created in the data, providing one or more watermarks for the data, and the method ends.

Although the present invention has been described with several embodiments, divers changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A computer-implemented system for protecting from unauthorized reproduction data associated with one or more products that is communicated over a communications network, the system comprising one or more servers collectively operable to:

receive from a buyer computer a search query for data associated with one or more products, the search query specifying one or more search criteria;

communicate, in response to receiving the search query from the buyer computer, the search query to one or more databases in which data associated with one or more products is stored;

receive data associated with one or more products matching the search criteria specified in the search query received from the buyer computer, the data having been collected in response to communicating the search query to the one or more databases in which data associated with one or more products is stored;

communicate, in response to receiving the data associated with the one or more products matching the search criteria specified in the search query received from the buyer computer, to the buyer computer the data for the matching products; and communicate, along with the data for the matching products, a software component to the buyer computer, the software component operable to:

provide a user associated with the buyer computer access to the data for less than all of the matching products such that the user associated with the buyer computer can only access less than all of the matching products; and disable one or more tools supported at the buyer computer for reproducing the data for the matching products.

2. The system of claim 1, wherein the software component is an applet.

3. The system of claim 1, wherein the software component is a plug-in.

4. The system of claim 1, wherein reproducing the data comprises at least one of cutting and pasting, screen dumping, and printing.

5. The system of claim 1, wherein the software component is uniquely associated with and communicated to the buyer with the data for the matching products.

6. The system of claim 1, wherein the software component is not uniquely associated with and is communicated to the buyer separate from the data for the matching products.

7. The system of claim 1, wherein the one or more servers are collectively further operable to encrypt the data for the one or more matching products and communicate to the buyer computer the encrypted data for the matching products to prevent an unintended recipient of the data from making effective use of the data, the software component operable to decrypt the encrypted data for use by the user associated with the buyer computer.

8. The system of claim 1, further comprising:

a directory structure comprising a plurality of hierarchically organized product classes, each product class categorizing a plurality of products and defining one or more attributes of the products categorized in the product class, there being one or more pointers associated with one or more of the product classes, each pointer identifying a particular database in which data enabling a product transaction is stored for products categorized in the product class;

the one or more servers being collectively further operable to communicate, in response to selection of a product class, a search query for product data to one or more particular databases identified by the one or more pointers associated with the selected product class.

9. A computer-implemented method for protecting from unauthorized reproduction data associated with one or more products that is communicated over a communications network, comprising:

receiving from a buyer computer a search query for data associated with one or more products, the search query specifying one or more search criteria;

communicating, in response to receiving the search query from the buyer computer, the search query to one or more databases in which data associated with one or more products is stored;

receiving data associated with one or more products matching the search criteria specified in the search query received from the buyer computer, the data having been collected in response to communicating the search query to the one or more databases in which data associated with one or more products is stored;

communicating, in response to receiving the data associated with the one or more products matching the search criteria specified in the search query received from the buyer computer, to the buyer computer the data for the matching products; and communicating, along with the data for the matching products, a software component to the buyer computer, the software component operable to:

provide a user associated with the buyer computer access to the data for less than all of the matching products such that the user associated with the buyer computer can only access less than all of the matching products; and disable one or more tools supported at the buyer computer for reproducing the data for the matching products.

10. The method of claim 9, wherein the software component is an applet.

11. The method of claim 9, wherein the software component is a plug-in.

12. The method of claim 9, wherein reproducing the data comprises at least one of cutting and pasting, screen dumping, and printing.

13. The method of claim 9, wherein the software component is uniquely associated with and communicated to the buyer with the data for the matching products.

14. The method of claim 9, wherein the software component is not uniquely associated with and is communicated to the buyer separate from the data for the matching products.

15. The method of claim 9, further comprising encrypting the data for the one or more matching products and communicating to the buyer computer the encrypted data for the matching products to prevent an unintended recipient of the data from making effective use of the data, the software component operable to decrypt the encrypted data for use by the user associated with the buyer computer.

16. The method of claim 9, further comprising:

providing the user associated with the buyer computer access to a directory structure comprising a plurality of hierarchically organized product classes, each product class categorizing a plurality of products and defining one or more attributes of the products categorized in the product class, there being one or more pointers associated with one or more of the product classes, each pointer identifying a particular database in which data enabling a product transaction is stored for products categorized in the product class;

communicating, in response to selection of a product class by the user, a search query for product data to one or more particular databases identified by the one or more pointers associated with the selected product class.

17. Software for protecting from unauthorized reproduction data associated with one or more products that is communicated over a communications network, the software being embodied in computer-readable media and when executed operable to:

receive from a buyer computer a search query for data associated with one or more products, the search query specifying one or more search criteria;

communicate, in response to receiving the search query from the buyer computer, the search query to one or more databases in which data associated with one or more products is stored;

receive data associated with one or more products matching the search criteria specified the search query received from the buyer computer, the data having been collected in response to communicating the search query to the one or more databases in which data associated with one or more products is stored;

communicate, in response to receiving the data associated with the one or more products matching the search criteria specified in the search query received from the buyer computer, to the buyer computer the data for the matching products; and communicate, along with the data for the matching products, a software component to the buyer computer, the software component operable to:

provide a user associated with the buyer computer access to the data for less than all of the matching products such that the user associated with the buyer computer can only access less than all of the matching products; and disable one or more tools supported at the buyer computer for reproducing the data for the matching products.

18. The software of claim 17, wherein reproducing the data comprises at least one of cutting and pasting, screen dumping, and printing.

19. The software of claim 17, wherein the software component is uniquely associated with and communicated to the buyer with the data for the matching products.

20. The software of claim 17, further operable to encrypt the data for the one or more matching products and communicating to the buyer computer the encrypted data for the matching products to prevent an unintended recipient of the data from making effective use of the data, the software component operable to decrypt the encrypted data for use by the user associated with the buyer computer.

* * * * *